United States Patent [19]

Coplan et al.

[11] 4,328,730
[45] May 11, 1982

[54] MEANS FOR SLICING MODULE TERMINATION PLUG

[75] Inventors: Myron J. Coplan, Natick; Friedhelm Bilewski, Medway, both of Mass.

[73] Assignee: Albany International Corp., Menands, N.Y.

[21] Appl. No.: 176,720

[22] Filed: Aug. 11, 1980

[51] Int. Cl.³ .................... B26D 3/14; B26D 5/12; B26D 7/01
[52] U.S. Cl. .................... 83/581; 83/636; 83/639; 83/697; 83/917
[58] Field of Search ............ 83/580, 581, 697, 689, 83/915, 636, 917, 54

[56] References Cited

U.S. PATENT DOCUMENTS

| | | | |
|---|---|---|---|
| 701,963 | 6/1902 | Taylor | 83/917 X |
| 1,114,154 | 10/1914 | Leach | 83/636 X |
| 2,936,665 | 5/1960 | Naffin | 83/636 X |
| 3,073,195 | 1/1963 | Koster | 83/581 X |
| 3,153,963 | 10/1964 | Coulon et al. | 83/581 X |
| 3,227,025 | 1/1966 | MacMillan | 83/581 |
| 3,299,759 | 1/1967 | Johnson et al. | 83/581 |

Primary Examiner—Frank T. Yost
Attorney, Agent, or Firm—Kane, Dalsimer, Kane, Sullivan and Kurucz

[57] ABSTRACT

A cutting device for slicing through a plug of potting compound is disclosed which has a plug support and an inverse plow shaped cutter blade movable relative thereto.

2 Claims, 9 Drawing Figures

FIG.6  FIG.7
FIG.9
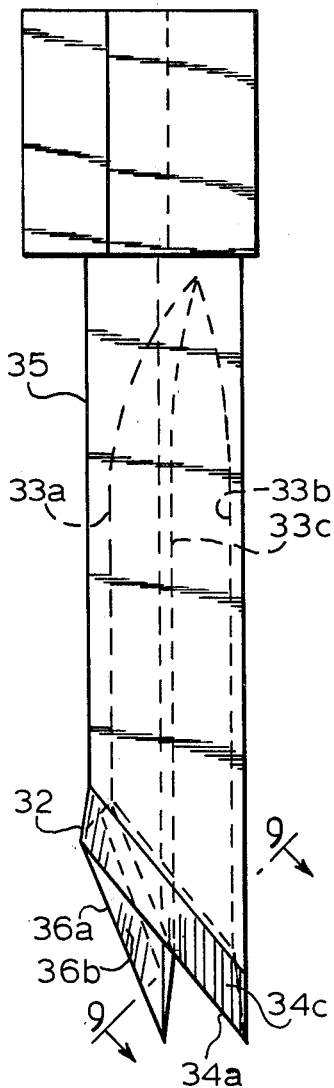
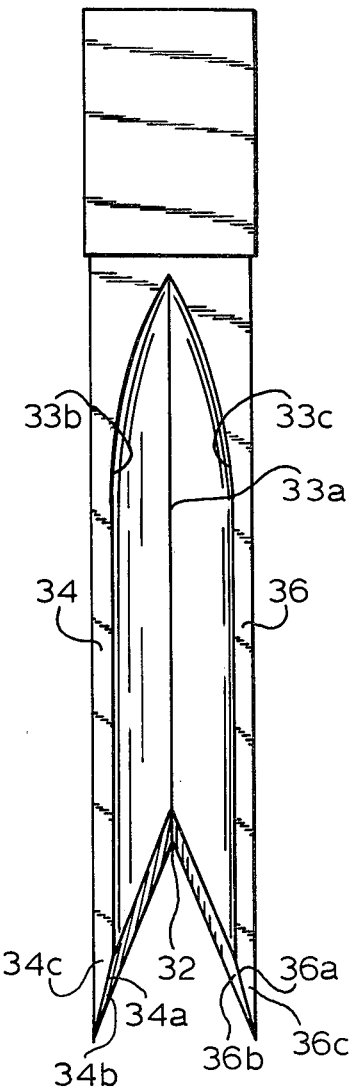
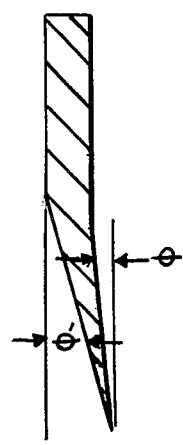
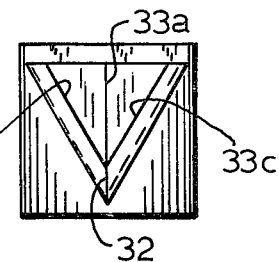
FIG.8

MEANS FOR SLICING MODULE TERMINATION PLUG

BACKGROUND OF THE INVENTION

The use of membranes to effect separation of gas/gas, liquid/liquid, and liquid/solid mixtures and solutions has achieved general industrial applicability by various methods, among them being ultrafiltration, hyperfiltration, reverse osmosis and dialysis. In general, membrane elements associated with these processes are contained in vessels called modules, comprising a container having various inlet and outlet ports and an assembly of membranes within said container. The internal configurations are so arranged as to permit the introduction of a feed stream with or without pressure on the upstream face of the membranes, means for collecting permeate which passes through the membranes and emerges on their downstream faces, and means for keeping feed and permeate materials from commingling.

Membranes have been fabricated in various shapes, such as (1) flat sheets which may be supported in a typical plate and frame structure similar to a filter press; (2) flat sheets rolled into spirals with spacing materials interleaved with the membrane and the assembly sealed to provide spiroidal channels permitting the passage of a feed on one side of the coiled membrane through spaces to the opposite side of the membrane; (3) as tubes lining the inner surface of a reinforced braid, the braid itself at times being a component in a larger tube; and (4) in the form of open-ended hollow fibers so organized and sealed into header plates as to provide a separation of the flows over the external surfaces of the hollow fibers from any flow within the bores of the hollow-fibers ensuing by virtue of passage of permeant across the membrane.

Of particular interest is the use of hollow fibers assembled in modular form to provide the desired separation.

In U.S. applications for Letters Patent Ser. No. 943,738 filed Sept. 19, 1978, now U.S. Pat. No. 4,207,192, Ser. No. 943,739 filed Sept. 19, 1978, Ser. No. 943,793 filed Sept. 19, 1978, now U.S. Pat. No. 4,210,536 and Ser. No. 956,032 filed Oct. 30, 1978, now U.S. Pat. No. 4,220,489, various techniques for the selection and winding of hollow fibers and the fabrication and assembly of such fibers into modular form is taught. It is noted that a significant consideration in this work is the manner and means of terminating the hollow fibers so that the ends can be opened to allow for recovery of material within the hollows of the fibers and at the same time provide suitable support to resist the thrust forces developed by the internal pressures within the module shell. In the applications for Letters Patent identified above, the proper use of potting compound solidified about fiber ends with silica taken therein to expose the fiber bores while providing adequate support to resist internal pressure is taught. The provision of recesses of proper configuration and position in the potting compound within which the fiber ends are disposed is illustrated.

It was found however that the necessary proper configuration and position of recess could be achieved only with great difficulty and consumption of time and that repetition could not be achieved with accuracy by the use of known methods and equipment.

SUMMARY OF THE INVENTION

The present invention provides a unique method and device for slicing a module termination plug in which the module is held by a base platform which cooperates with a cutting blade, of particular configuration to provide a wedging action to slice through the termination plug to accurately and quickly and with a high degree of predictable repetition expose the fiber bores while maintaining structural integrity.

BRIEF DESCRIPTION OF THE DRAWINGS

FIGS. 6, 7, 8 and 9 are partially sectional views of the cutting blade taken from different directions to show the angular configuration of the blade, FIG. 6 is a perspective view looking down on the blade as viewed in FIG. 1, FIGS. 7 and 8 are bottom and end views respectively and FIG. 9 is a partially sectional view taken along line 9—9 in the direction of the arrows as shown in FIG. 6.

DESCRIPTION OF THE PREFERRED EMBODIMENT

Figure 1:
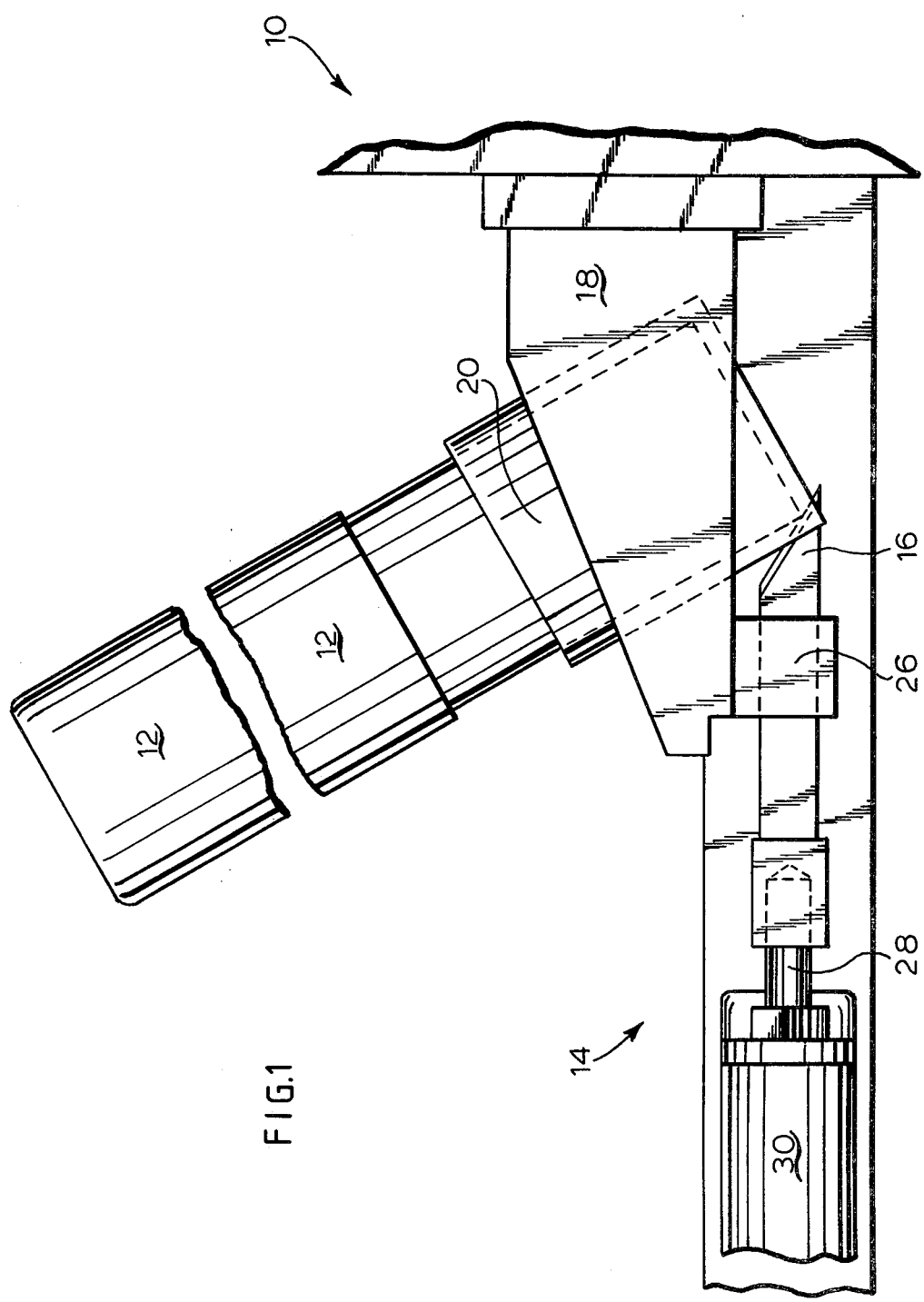
FIG. 1 is an elevation of a device for slicing a module termination plug constructed in accordance with the teaching of this invention.

The slicing device as shown in the figures includes a fixed assembly 10 for supporting module 12 in position and a movable assembly 14 for reciprocating cutting blade 16 into and out of slicing position.

The fixed assembly 10 further includes a housing 18 which supports cylindrical receptacle 20 within which module 12 is contained with a portion of plug 22 thereof due to the notch 24 in receptacle 20 exposed to the cutting blade 16 which during reciprocal movement thereof is guided to the notch by guide means 26 which is also mounted on housing 18.

The cutting blade 16 is mounted on shaft 28 of slow speed pnuematic cylinder 30 and is of compound V or inverse plow (mirror image of a plow) configuration so that it digs into the potting compound or plug 22 while undergoing a minimum resistance from sheared material. The cutting blade 16 is formed of D2 tool steel hardened to Rockwell C 60, ground and stress relieved so that it is hard enough to give in the face of the wedging action which it encounters as it enters the compound.

The blade 16 as viewed in the Figures is in the configuration of an inverse plow or mirror imge of a plow.

The blade can be formed out of triangular stock with one surface hollowed out to provide two sides which project a V. As shown in the Figures the bore of the cut out portion is defined essentially by lines 33a, 33b and 33c. A V and the segment removed results at the cutting zone in two separate sub-blades, 34 and 36, each with its own cutting edge 34a and 36a respectively. Line 33a meets line 32 of the cutting zone. Each of the sub-blades has a uniform side reflex angle 34b and 36b but with each having two distinct sections of different side rake or clearance angles. The sub-blades are mirror images.

Thus in a typical embodiment where the cutting edges 34a and 36a are depressed from the horizontal as defined by apex at an angle of thirty degrees from above, the rake angle $\theta$ of sector 34c is five degrees while the rake angle $\theta$ of sector 34d is fifteen degrees. The situation is similar but reversed for sub-blade 36 as is obvious from the Figures.

Figure 2:
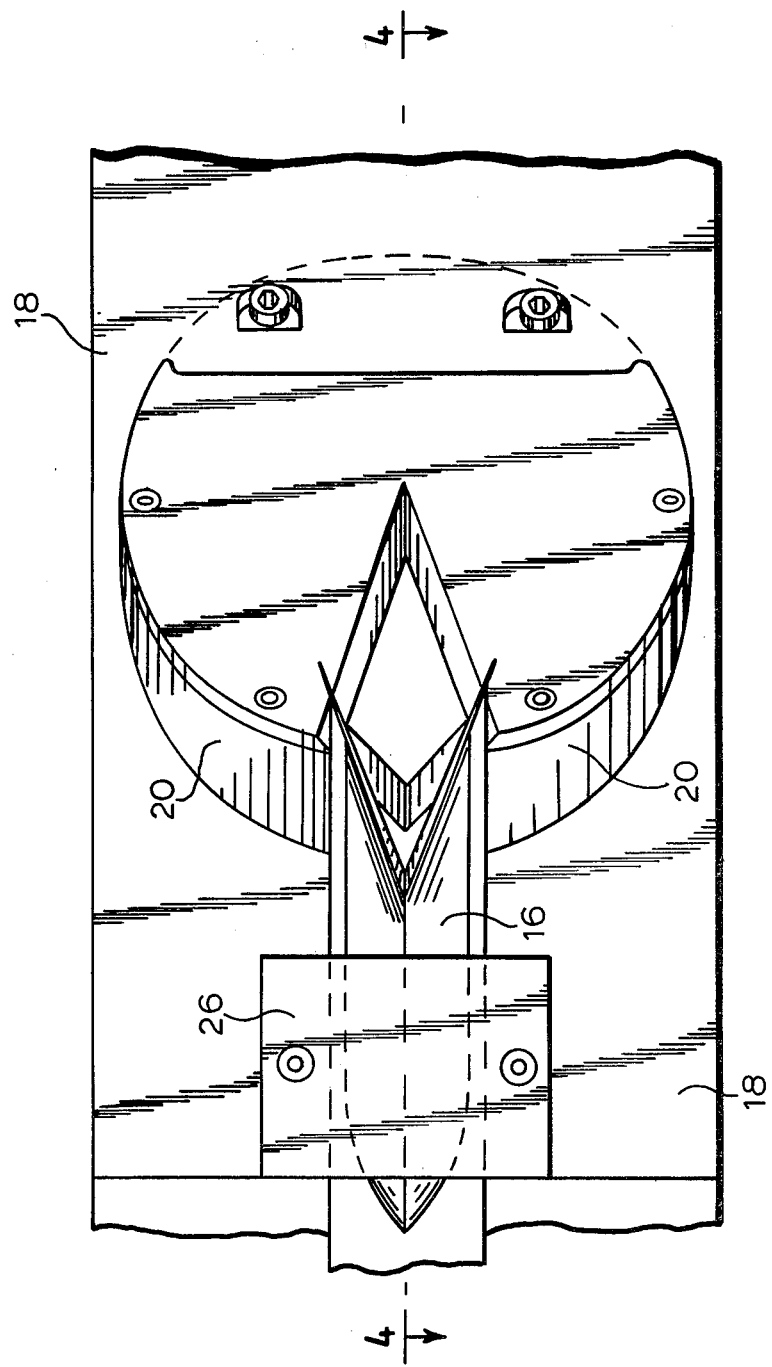
FIG. 2 is a partially sectional view from beneath of the device shown in FIG. 1 showing the cutting blade and base platform.
Figure 3:
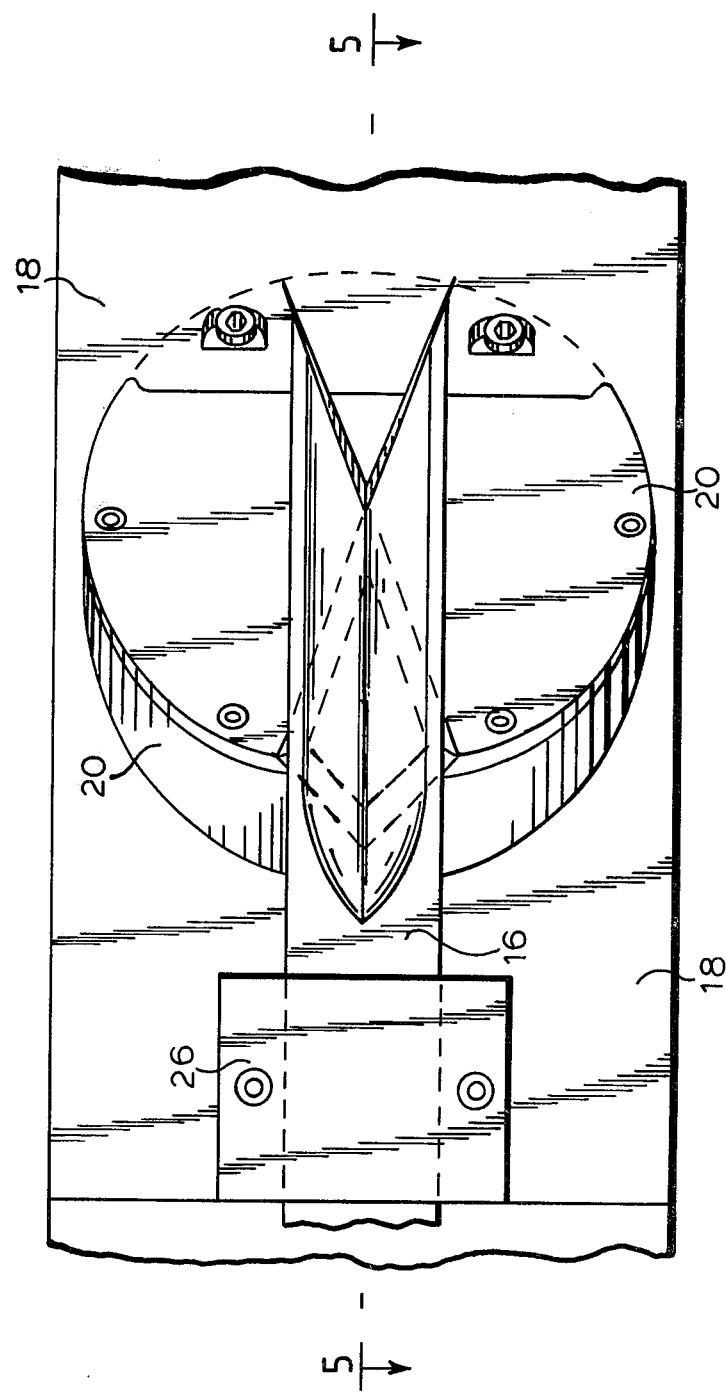
FIG. 3 is a view similar to FIG. 2 with the blade fully advanced into the base platform.
Figure 4:
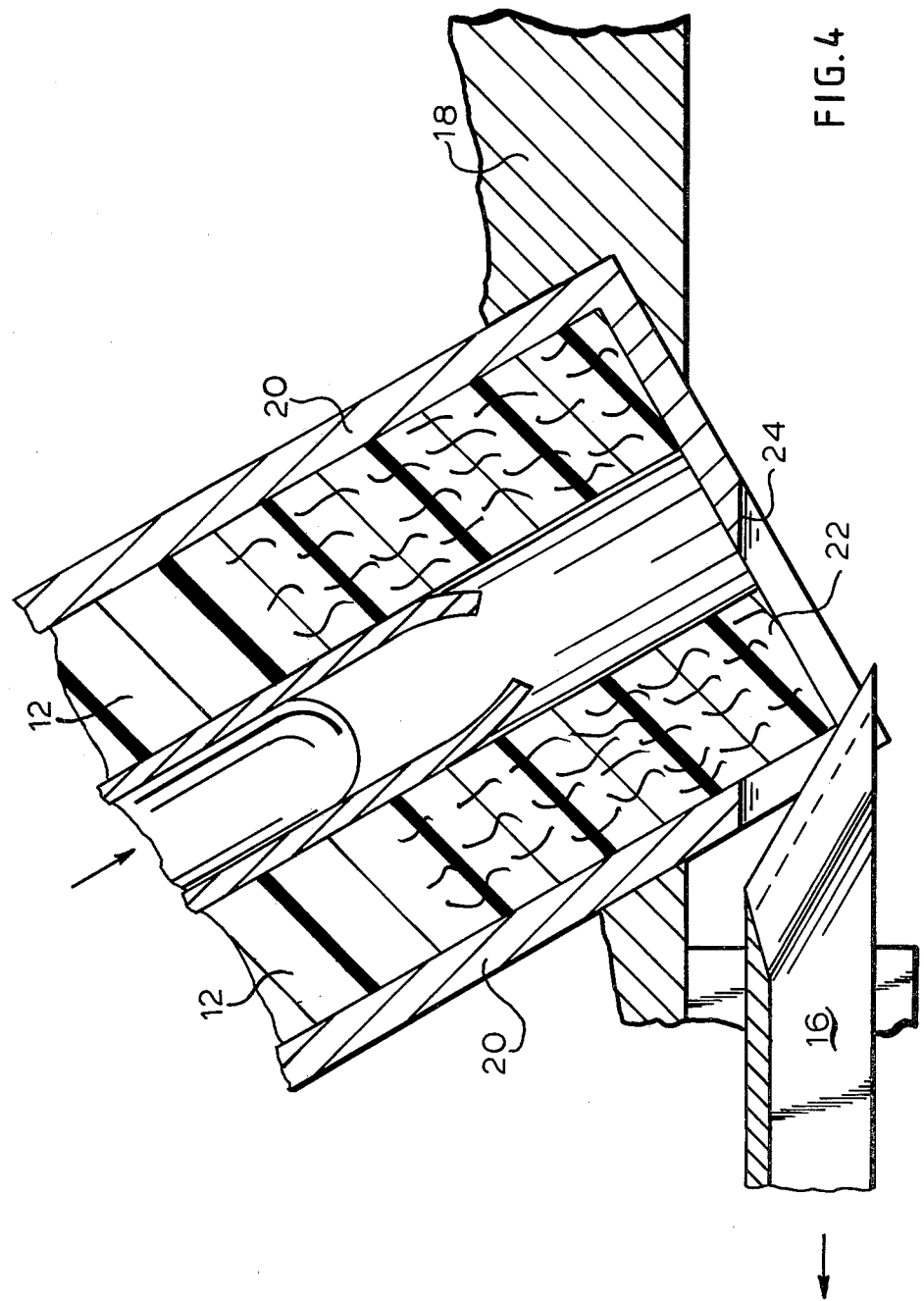
FIG. 4 is a partially sectional view taken on the line 4—4 in the direction of the arrows in FIG. 2 illustrating the cutting blade approaching a module termination plug positioned in the base platform.
Figure 5:
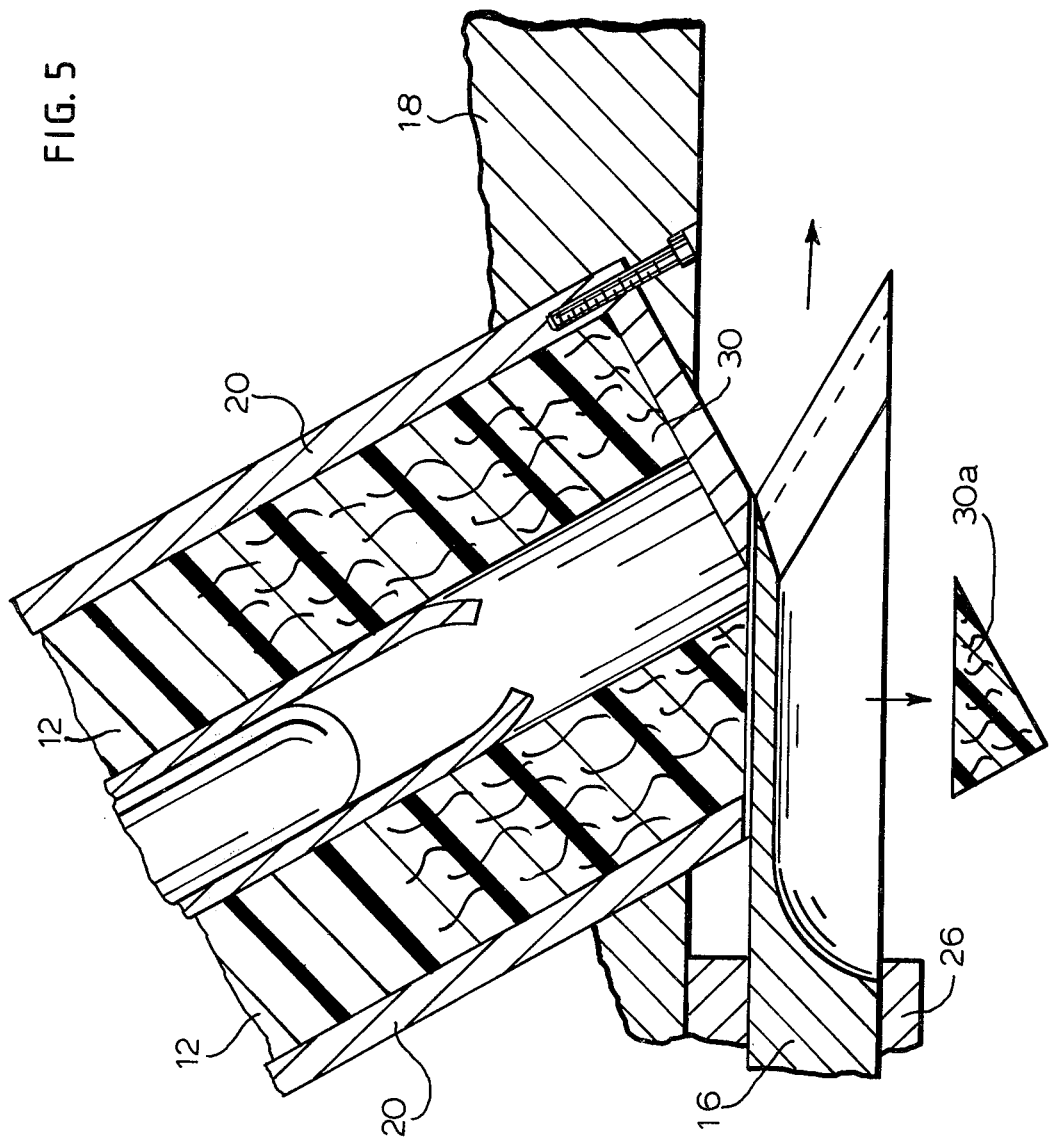
FIG. 5 is a partially sectional view similar to FIG. 4 but taken on line 5—5 in the direction of the arrows in FIG. 3 illustrating a slice being taken on the module termination plug.

In use, the module 12 is placed in position within receptacle 20 when the blade 16 is in the position shown in FIGS. 1, 2, and 4. a portion of the plug 22 appears at notch 24. The cylinder 30 is actuated to move plunger 28 with blade 16 attached to the right as seen in FIGS. 3 and 5 so that the blade, as guided by guide 26, will slice the potting compound as desired separation a portion 30a therefrom as seen in FIG. 5.

We claim:

1. A slicing device for slicing through a plug of potting compound including in combination a housing assembly for supporting said plug, a cutting blade, a cutting position of said blade, means for moving said blade into and out of said cutting position, said cutting blade being in the configuration of an inverse plow, said blade having two sides which project a V resulting at the cutting zone of said blade in two separate sub-blades each of which has a uniform side reflex angle and two distinct sections of different side rake angles and in which each of said sub-blades has a cutting edge depressed from the horizontal at an angle of thirty degrees with one rake angle being of five degrees and the remaining rake angle of fifteen degrees.

2. A slicing device in accordance with claim 1 in which said housing has receptacle in which said plug is contained and a notch formed in said receptacle exposing said plug to said cutting blade in the cutting position thereof.

* * * * *

UNITED STATES PATENT AND TRADEMARK OFFICE
CERTIFICATE OF CORRECTION

PATENT NO. :       4,328,730
DATED       :       May 11, 1982
INVENTOR(S) :      Myron J. Coplan et al It is certified that error appears in the above—identified patent and that said Letters Patent is hereby corrected as shown below:

Column 1, after the title, insert the following paragraph
--The Government has rights in this invention pursuant to
Contract No. 14-34-0001-7551 awarded by the Office of Water
Research and Technology of the United States Department of
the Interior--.

Signed and Sealed this

Tenth Day of May 1983

[SEAL]

Attest:

Attesting Officer

GERALD J. MOSSINGHOFF

Commissioner of Patents and Trademarks